US012012695B2

(12) United States Patent
Lönngren et al.

(10) Patent No.: US 12,012,695 B2
(45) Date of Patent: Jun. 18, 2024

(54) DOUBLE-DISC REFINER

(71) Applicant: VALMET AB, Sundsvall (SE)

(72) Inventors: Karl Lönngren, Skanör (SE); Mikael Lundfors, Hässelby (SE)

(73) Assignee: VALMET AB, Sundsvall (SE)

(*) Notice: Subject to any disclaimer, the term of this patent is extended or adjusted under 35 U.S.C. 154(b) by 389 days.

(21) Appl. No.: 17/438,100

(22) PCT Filed: Feb. 17, 2020

(86) PCT No.: PCT/SE2020/050172
§ 371 (c)(1),
(2) Date: Sep. 10, 2021

(87) PCT Pub. No.: WO2020/185140
PCT Pub. Date: Sep. 17, 2020

(65) Prior Publication Data

US 2022/0186437 A1 Jun. 16, 2022

(30) Foreign Application Priority Data

Mar. 13, 2019 (SE) .................................... 1950318-4

(51) Int. Cl.
*D21D 1/30* (2006.01)
*B02C 7/12* (2006.01)

(52) U.S. Cl.
CPC ............... *D21D 1/303* (2013.01); *B02C 7/12* (2013.01)

(58) Field of Classification Search
CPC .......... D21D 1/303; D21D 1/30; D21D 1/306; B02C 7/12
See application file for complete search history.

(56) References Cited

U.S. PATENT DOCUMENTS

| | | | |
|---|---|---|---|
| 3,207,450 | A | 9/1965 | Horstman |
| 3,685,747 | A | 8/1972 | Horstman |

(Continued)

FOREIGN PATENT DOCUMENTS

| | | | |
|---|---|---|---|
| EP | 0575803 | A1 | 12/1993 |
| JP | 54-30906 | A | 3/1979 |
| SE | 362671 | B | 12/1973 |

OTHER PUBLICATIONS

Extended European Search Report issued in connection with EP Appl. Ser. No. 20769001.7 dated Jun. 6, 2023.

(Continued)

*Primary Examiner* — Faye Francis
(74) *Attorney, Agent, or Firm* — Foley & Lardner LLP

(57) ABSTRACT

A double disc refiner includes a first refining disc at a feed end and an opposing second refining disc. The first disc has inlet opening(s) and a first distal surface facing a second disc opposing surface. A first disc refining segment has a second distal surface facing the opposing surface that has a first height relative to a plane of the first distal surface in a direction toward the opposing surface. A first disc center plate has elongated protrusions radially extending therefrom and a third distal surface having a second height in the direction of the first height that is at least equal to the first height. Each protrusion has a fourth distal surface continuous with the third distal surface and a third height in the direction of the first height equal to the second height. The third distal surface is separated from the opposing surface by 5-15 mm.

2 Claims, 4 Drawing Sheets

(56) References Cited

U.S. PATENT DOCUMENTS

| | | | | |
|---|---|---|---|---|
| 3,889,890 | A | 6/1975 | Horstman | |
| 4,005,827 | A * | 2/1977 | Frair | D21D 1/303<br>241/245 |
| 4,269,365 | A * | 5/1981 | Berggren | B02C 7/11<br>241/247 |
| 4,301,974 | A | 11/1981 | Sjöbom | |
| 4,820,381 | A * | 4/1989 | Brown | D21D 1/30<br>241/245 |
| 5,040,736 | A | 8/1991 | Obitz | |
| 5,167,373 | A | 12/1992 | Bohn et al. | |
| 5,200,038 | A * | 4/1993 | Brown | B02C 7/06<br>241/245 |
| 5,335,865 | A * | 8/1994 | Kohler | D21D 1/30<br>241/261.3 |
| 6,227,471 | B1 | 5/2001 | Virving | |
| 2016/0023216 | A1 | 1/2016 | Lönngren | |
| 2018/0229242 | A1 | 8/2018 | Lindblom | |
| 2019/0264389 | A1 * | 8/2019 | Gingras | D21D 1/306 |

OTHER PUBLICATIONS

Office Action issued in connection with Japanese Appl. No. 2021-549281 dated Oct. 31, 2023.

* cited by examiner

DOUBLE-DISC REFINER

TECHNICAL FIELD

The present invention generally relates to disc refiners, and more particularly, to a double-disc pulp refiner comprising a disc center plate.

BACKGROUND

Double-disc pulp refiners have been utilized for many years to refine pulp and similar material by subjecting the pulp to the heat and stresses generated as the pulp passes radially through closely spaced, counter-rotating discs. As an example of prior art, the patent document U.S. Pat. No. 5,167,373 describes a double disc refiner in which two counter-rotating refiner discs which define a refining zone therebetween are counter-rotated at different speeds.

FIG. 1 is a schematic illustration of a part of a typical double disc refiner 10 according to prior art, with two refining discs 11, 12 rotating with different rotational speeds and/or in opposite directions, i.e. counter-rotating. The refiner 10 comprises a casing 17 into which feedstock such as lignocellulosic material M is fed through a feed tube 18. The feedstock then flows together with steam and dilution water through inlet openings/channels 16 in a first refining disc 11 on the feed side to end up in a space between the opposed refining discs 11, 12. First and second coaxial shafts 31, 31' are independently rotated, usually in opposite rotational directions R, R' by electric motors 30, 30'. The first refining disc 11 at the feed end is thereby counter-rotated relative to a coaxial, spaced apart and opposed second refining disc 12 within the casing 17. The refining discs 11, 12 are provided with grinding plates, usually divided into one or more respective refining segments 13, 14 defining a refining zone 15 therebetween, where the pulp is refined under the influence of heat and friction generated by the counter-rotating discs. The one or more refining segments 13, 14 are located near the periphery of the refining discs 11, 12 and have carefully designed surface characteristics for influencing the nature of the work performed on the pulp as it passes radially through the refining zone 15. The refined pulp M' passes radially through the space between the discs, and is discharged from the casing 17 in a known manner. The distance between the opposed discs 11, 12 is maintained greater than a minimum safe value, e.g. by means of a control system (not shown), usually hydraulic. The minimum safe value should be as small as possible, but still without risking that the refining segments of the discs touch each other during operation. The refining discs 11, 12 typically have the same outer diameter, which defines the circumferential perimeter through which the refined pulp passes just prior to extraction through the wall of the casing 17. It should however be appreciated that, although the discs 11, 12 shown in FIG. 1 are substantially annular, the term as used herein is meant to include functional equivalents having different shapes, such as conical mating surfaces defining a refining zone therebetween.

A problem in this type of refiner is that the incoming feedstock which enters non-centrally into the refiner may move not only towards the periphery of the refining discs as desired, but also towards the center of the refining discs, where the material may pile up which can negatively affect the distribution of material in the refiner. This may result in an uneven and turbulent material feed, leading to a higher specific energy consumption and lower production rate.

Therefore, there is a need in the art to improve the material distribution in the refining area of a double disc refiner.

SUMMARY

It is an object to provide a center plate which improves the distribution of lignocellulosic material in the refining area of a double disc pulp refiner.

This and other objects are met by embodiments of the proposed technology.

The invention relates to a double disc pulp refiner comprising a first refining disc and a second refining disc, the first refining disc being arranged at a feed end of the refiner where lignocellulosic material is fed into the refiner through inlet openings in the first refining disc and the second refining disc being arranged coaxially, spaced apart from and opposed to the first refining disc, said first refining disc being provided with at least one refining segment for refining the lignocellulosic material and a center plate having a cross-sectional profile adapted such that when the center plate is arranged on the first refining disc in the refiner, the center plate protrudes to a maximum height which is the same as, or higher than, a maximum height of the at least one refining segment provided on the first refining disc, said double disc pulp refiner, wherein said maximum height is such that the distance between the distal surface of said center plate and the surface of said second refining disc is as small as possible without having their surfaces touching each other.

Some advantages of the proposed technology are:

The material feed into the refiner will be less turbulent and therefore more stable and efficient. This results in a higher production rate and a lower specific energy consumption. The steam flow through the refiner may also be reduced.

Other advantages will be appreciated when reading the detailed description.

BRIEF DESCRIPTION OF THE DRAWINGS

The invention, together with further objects and advantages thereof, may best be understood by making reference to the following description taken together with the accompanying drawings, in which.

DETAILED DESCRIPTION

The present invention generally relates to disc refiners, and more particularly, to a double-disc refiner comprising a center plate.

Throughout the drawings, the same reference designations are used for similar or corresponding elements.

As mentioned in the background section there is a need in the art to improve the material distribution in double disc pulp refiners. A problem in a typical double disc refiner is that the feeding of material into the refiner is not well controlled. The feedstock flows together with steam and dilution water through openings/channels in the refining disc on the feed side to end up between the refining discs. As described above, a problem in a typical double disc refiner is that the incoming feedstock which enters non-centrally into the refiner may move towards and pile up at the center of the refining discs, where it will not be refined since the refining of the material occurs between the refining segments which are located towards the periphery on the refining discs. The piling up of material in the middle results in an uneven and turbulent material feed, requiring a higher steam flow through the refiner and resulting in a higher specific energy consumption and lower production rate.

Figure 1:
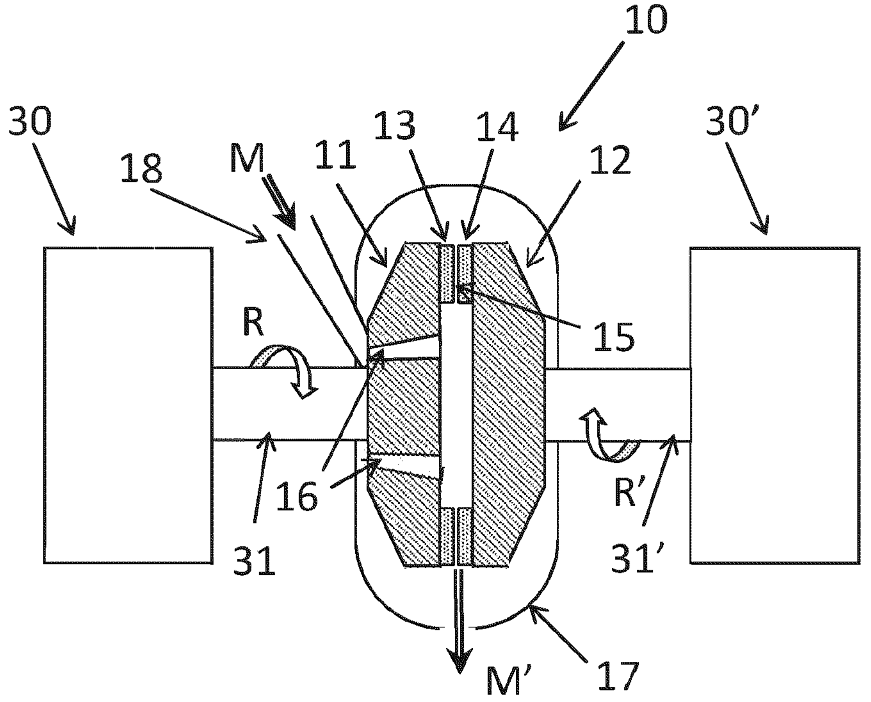
Prior Art Fig. 1
FIG. 1 is a schematic illustration of a part of a typical double disc refiner according to prior art.
Figure 2:
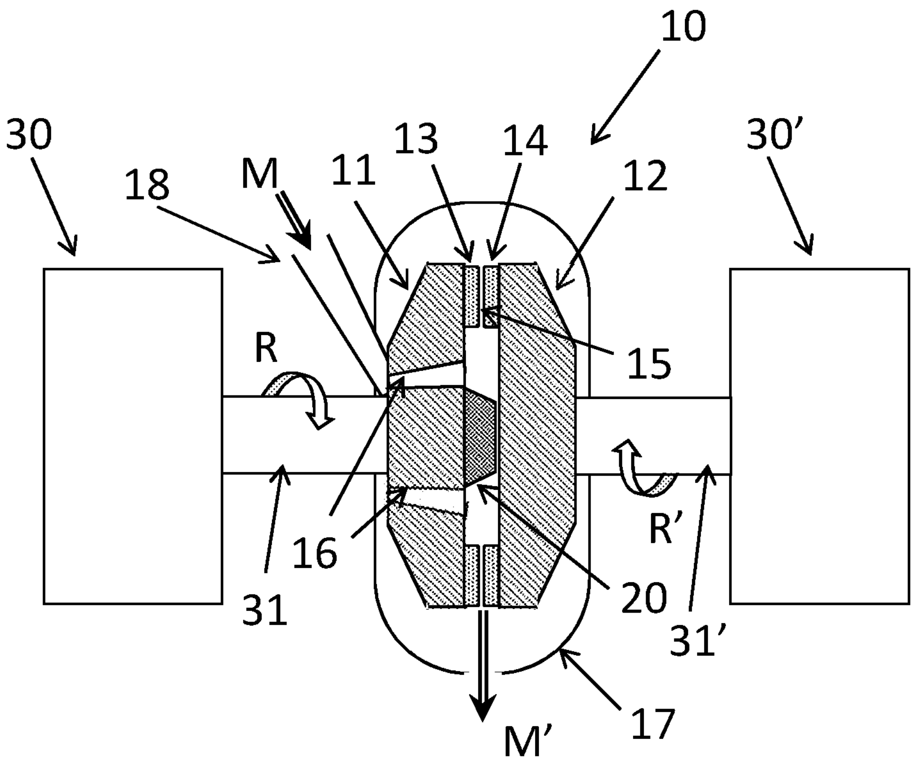
FIG. 2 is a schematic illustration of a part of a double disc refiner according to an embodiment of the present disclosure.

FIG. 2 is a schematic illustration of a part of a double disc refiner according to an embodiment of the present disclosure. The refiner 10 of FIG. 2 comprises similar features as the prior art refiner of FIG. 1, e.g. two refining discs 11, 12 rotating with different rotational speeds and/or in opposite directions, the refining discs 11, 12 being provided with respective refining segments 13, 14 defining a refining zone 15 therebetween, where lignocellulosic material M fed into the refiner 10 through inlet openings 16 in the first refining disc 11 is refined. However, as schematically illustrated in FIG. 2, the feed end refining disc 11 according to an embodiment of the present disclosure is further provided with a center plate 20 to prevent feedstock material from piling up at the center of the refining discs 11, 12, and to help feeding the lignocellulosic material towards the periphery of the refining discs 11, 12 and into the refining segments 13, 14 of the refining discs 11, 12.

The center plate 20 has a cross-sectional profile which may vary in thickness and/or in height, i.e. how far away from the surface of the first refining disc 11 the profile of the center plate 20 protrudes. The center plate 20 should fill up at least part of the space between the refining discs 11, 12 at the middle of the discs, in order to prevent material from piling up there. Thus, at least part of the cross-sectional profile of the center plate 20 should extend from the surface of the first refining disc 11 towards the surface of the second refining disc 12 and preferably, it should extend from the surface of the first refining disc 11 equally far as, or further away than, any part of a cross-sectional profile of the refining segments 13 provided on the first refining disc 11. In other words, the center plate 20 has a cross-sectional profile adapted such that when the center plate 20 is arranged on the first refining disc 11 in the refiner 10, the center plate 20 protrudes to a maximum height which is the same as, or higher than, the maximum height of the refining segments 13 provided on the first refining disc 11. This means that the distal surface, i.e. the surface facing away from the first refining disc 11, of the center plate 20 is located at least as far away from the surface of the first refining disc 11 as the distal surface of the refining segments 13 on the first refining disc 11. In a particular embodiment, the center plate 20 has a cross-sectional profile adapted such that the distance between the distal surface of the center plate 20 and the surface of the opposed second refining disc 12 is as small as possible without the surfaces risking to touch each other during operation, i.e. the distance is approaching the predefined minimum safe value described above. More specifically, the distance between the distal surface of the center plate 20 and the surface of the opposed second refining disc 12 is chosen such that the expected or allowed wear of the segments during their life-time is taken into account. (Due to wear, the thickness of the segments is continuously reduced during operation of a double-disc refiner, and by keeping a constant refiner gap between the discs, the distance between the distal surface of the center plate and the surface of the opposed second refining disc is consequently continuously reduced during operation.) Normally some manufacturing tolerances are also allowed and also some wobbling of the disc during their rotation. With these effects considered, the distance between the distal surface of the center plate 20 and the surface of the opposed second refining disc 12 can, for example, be set to 5-15 mm, and more preferably to 8-12 mm.

Figure 3A:
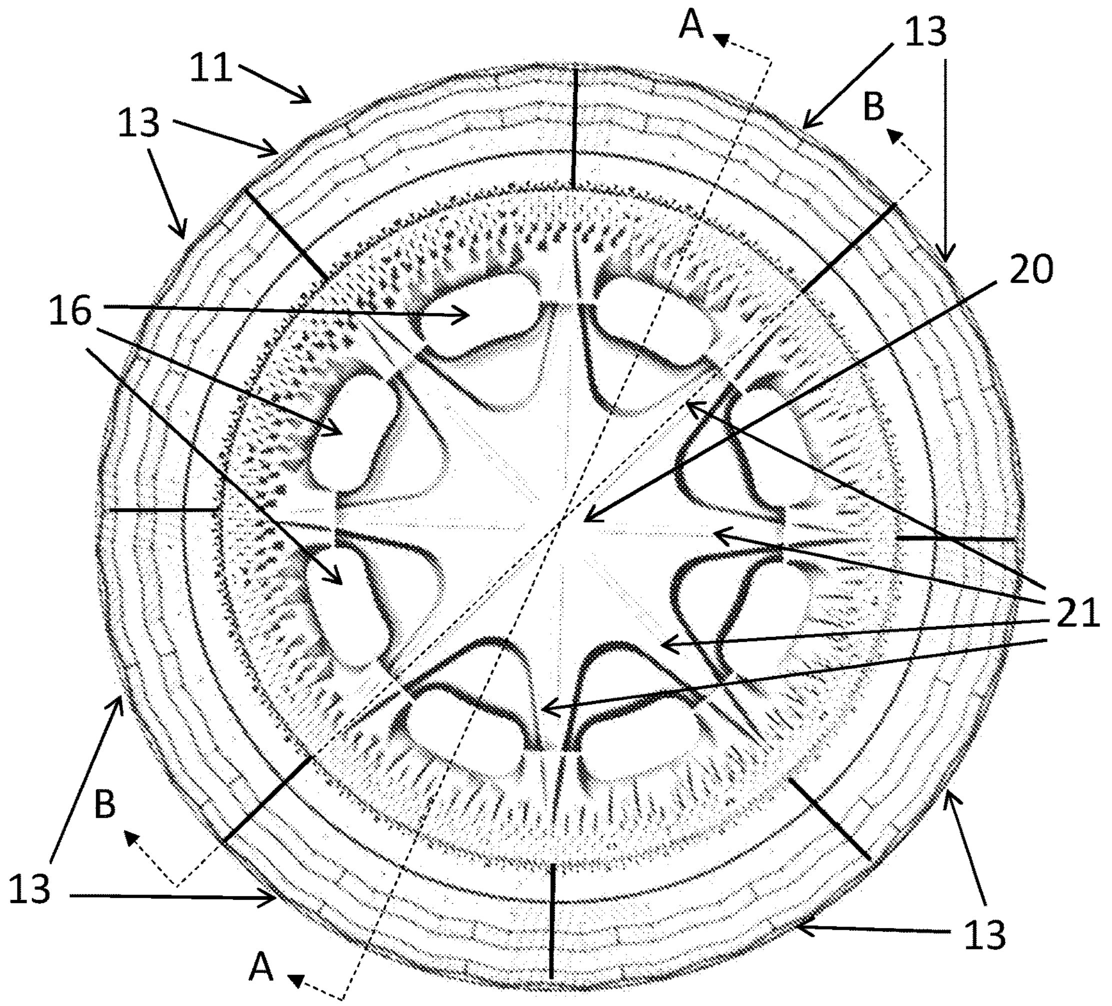
FIG. 3*a* is a schematic illustration of a refining disc provided with a center plate for a double disc refiner according to an embodiment of the present disclosure.
Figure 3B:
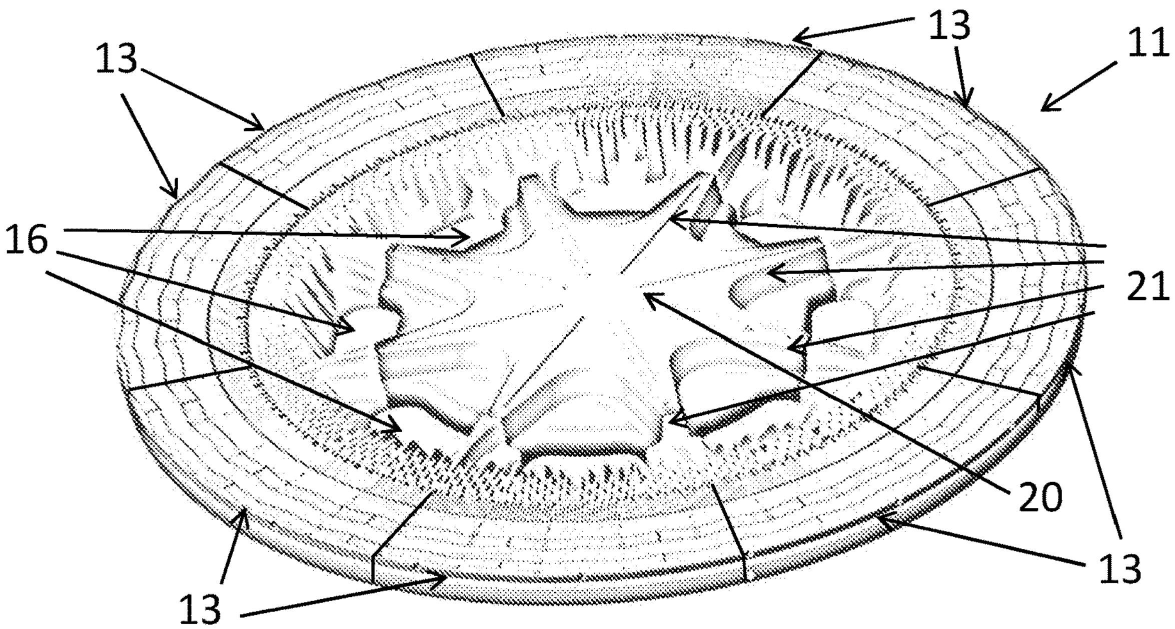
FIG. 3*b* is an angled view of the refining disc of FIG. 3*a;*

FIG. 3*a* is a schematic illustration of a feed end first refining disc 11 provided with a center plate 20 for a double disc refiner according to an embodiment of the present disclosure, and FIG. 3*b* is an angled view of the refining disc of FIG. 3*a*. The refining disc 11 is in this embodiment provided with at least one refining segment 13 around the circumference of the refining disc 11, a center plate 20 at the center of the refining disc 11, and inlet openings 16 between the center plate and the refining segments 13. In this embodiment the center plate 20 is provided with elongated protrusions or wings 21 extending in a radial direction on the center plate 20 and having a height that corresponds to the maximum height of the center plate 20. In an embodiment the wings 21 extend between the inlet openings 16 such that the wings 21 constitute barriers for the lignocellulosic material, to prevent lignocellulosic material from travelling between the inlet openings 16.

Figure 4A:
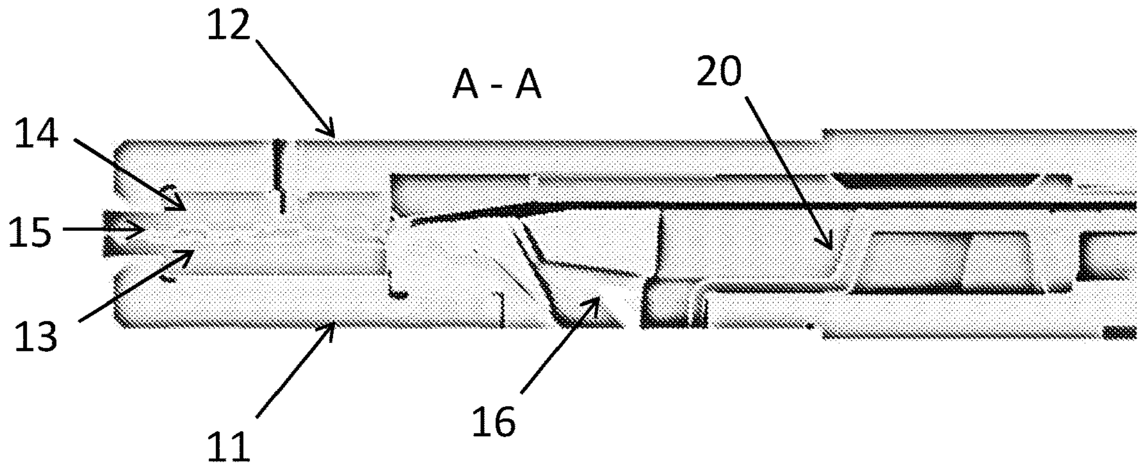
FIG. 4*a* is a cross-sectional view along line A-A of the refining disc of FIG. 3*a;*
Figure 4B:
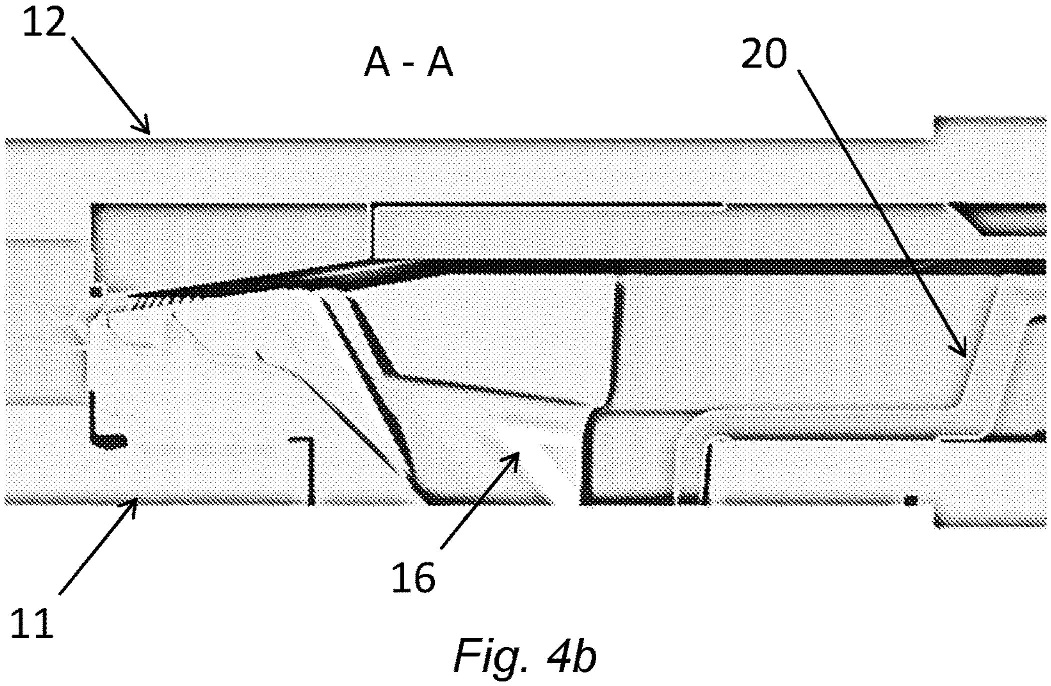
FIG. 4*b* is a close-up of a part of FIG. 4*a*.
Figure 4C:
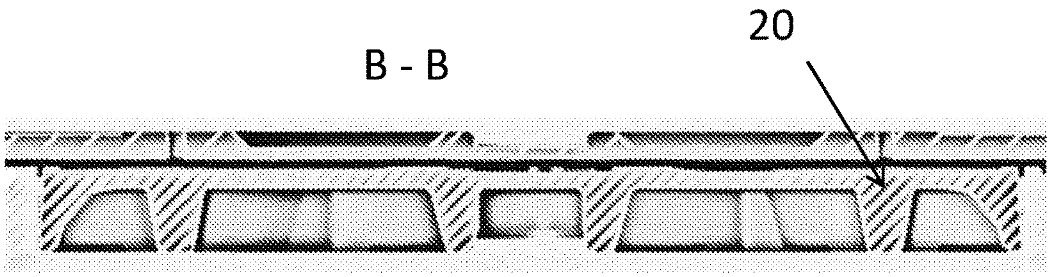
FIG. 4*c* is a cross-sectional view along line B-B of the refining disc of FIG. 3*a*.

FIG. 4*a* is a cross-sectional view along line A-A of the refining disc of FIG. 3*a*, showing the refining discs 11, 12 provided with respective refining segments 13, 14 defining a refining zone 15 between them. The center plate 20 is arranged at the center of the first refining disc 11 arranged at the feed end of the refiner and the inlet openings 16 are located between the center plate 20 and the refining segments 13 of the first refining disc 11. The distance between the surfaces of the center plate 20 and the second refining disc 12 is as small as possible without the surfaces risking to touch each other during operation, i.e. the distance is approaching the predefined minimum safe value of the refiner. FIG. 4*b* is a close-up of a part of FIG. 4*a*, and FIG. 4*c* is a cross-sectional view along line B-B of the refining disc of FIG. 3*a*, i.e. the inlet openings of the feed end disc are not visible from this view.

In summary, the present embodiments of a center plate as shown in FIGS. 2-4 provide a closed volume between the centers of the counter-rotating refining discs which concentrates the feeding of the feedstock material towards the periphery of the refining discs. Thus, the center plate according to the present invention will better distribute the incoming material to the refining segments and thereby reduce variations and turbulence in material feed. This results in a higher production rate, a lower specific energy consumption and a reduced steam flow through the refiner.

All embodiments of a center plate according to the present disclosure can be fitted to the feed side disc of well-known double disc pulp refiners. One example of such a double disc refiner with annular discs is schematically described above with reference to FIG. 1. Other configurations are however also possible to use in connection with a center plate according to the present disclosure, such as refiners with discs having conical or spherical mating surfaces.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

The invention claimed is:

1. A double disc pulp refiner comprising:

a first refining disc at a feed end of the refiner; and a second refining disc coaxial to and opposing the first refining disc; wherein:

the first refining disc comprises:

one or more inlet openings configured to receive lignocellulosic material, a first distal surface facing an opposing surface of the second refining disc, at least one refining segment configured to refine the lignocellulosic material and having a second distal surface facing the opposing surface of the second refining disc, the second distal surface having a first height relative to a plane of the first distal surface in a direction toward the opposing surface of the second refining disc, a center plate having a third distal surface, the third distal surface having a second height from the plane of the first distal surface toward the opposing surface of the second refining disc, the second height being greater than or equal to the first height, elongated protrusions extending from the center plate in a radial direction, at least a portion of each elongated protrusion having a fourth distal surface that is continuous with the third distal surface and having a third height from the plane of the first distal surface toward the opposing surface of the second refining disc, the third height being equal to the second height; and the third distal surface of the center plate is separated from the opposing surface of the second refining disc by 5-15 mm.

2. The double disc refiner of claim 1, wherein:

the elongated protrusions extend between the inlet openings of the first refining disc.

* * * * *